United States Patent [19]

O'Connell

[11] Patent Number: 5,073,038
[45] Date of Patent: Dec. 17, 1991

[54] SWIVEL BEARING

[75] Inventor: Timothy B. O'Connell, Fort Wayne, Ind.

[73] Assignee: Tuthill Corporation, New Haven, Ind.

[21] Appl. No.: 551,286

[22] Filed: Jul. 12, 1990

[51] Int. Cl.⁵ ............................................. F16C 23/04
[52] U.S. Cl. .................................. 384/206; 384/203; 384/208
[58] Field of Search ........ 384/192, 202, 203, 206–212; 29/898.05

[56] References Cited

U.S. PATENT DOCUMENTS

| | | | |
|---|---|---|---|
| 3,085,312 | 4/1963 | Evans | 384/203 X |
| 3,629,921 | 12/1971 | Davies et al. | 29/898.05 X |
| 3,662,462 | 5/1972 | Shiflet | 384/206 X |
| 4,080,015 | 3/1978 | Greby et al. | 384/206 |

FOREIGN PATENT DOCUMENTS 873018 4/1953 Fed. Rep. of Germany ...... 384/206
964285 10/1982 U.S.S.R. .............................. 384/206

Primary Examiner—Thomas R. Hannon
Attorney, Agent, or Firm—Pearne, Gordon, McCoy & Granger

[57] ABSTRACT

A ball and socket bearing having a spherical ball member positioned within a non-metallic, molded bearing material which is in turn molded within a socket formed in a socket member. The socket provides openings on either side of the equator of the ball member having a radius less than the radius of the equator of the ball member so that a metal-to-metal interference prevents lateral separation of the members even in the event of bearing material failure. Further, the bearing material is relatively thin, at least between the ball member and socket adjacent to the lateral opening, so that the bearing material can support high lateral loads.

11 Claims, 2 Drawing Sheets

{ 5,073,038 }

SWIVEL BEARING

BACKGROUND OF THE INVENTION

This invention relates generally to ball and socket swivel bearings, and more particularly to a novel and improved swivel bearing of such type having a molded bearing material forming a spherical socket for a metal swivel ball member and to a novel and improved method of producing same.

PRIOR ART

U.S. Pat. No. 3,629,921 (assigned to the assignee of the present invention) describes and claims a ball and socket swivel bearing in which a non-metallic bearing material is molded within an outer metal socket member around an inner metal swivel ball member. The swivel member is formed with an external surface which is a portion of a sphere, and which mates with the interior surface of the non-metallic bearing material. With this structure, a swivel member and outer metal socket member can swivel relative to each other in all directions.

In such '921 patent, the molding process is performed while the inner swivel member is reciprocated laterally to produce a controlled amount of clearance between the non-metallic bearing material and the spherical surface of the swivel member. In devices having the structure illustrated in the '921 patent, a relatively thick layer of non-metallic bearing material provides a portion of reduced diameter on both sides of the equator of the ball member and, consequently, retains the ball swivel member in its position within the assembly. Further, in such devices, the metal outer shell provides an opening in which the bearing material is molded having side openings with a diameter exceeding the equator diameter of the ball swivel member. Therefore, in such a bearing unit, the non-metallic bearing material alone retains the ball swivel member in the socket. If sufficient lateral force is applied to the bearing material, it fails by distortion and the ball member moves laterally out of the socket, causing a complete failure of the bearing assembly. Further, if sufficient bearing material wear occurs, a similar failure can occur.

The U.S. Pat. No. 3,629,921, supra, is incorporated herein by reference in its entirety.

It is also known in the prior art to provide a two-piece, metal-to-metal ball and socket swivel joint in which a one-piece housing or socket member provides a socket having a spherical inner surface mating with a spherical outer surface of a metal ball member. In such devices, the metal housing provides portions on either side of the ball member equator which have a diameter less than the diameter of the ball member equator. Therefore, the ball member is trapped within the socket by metal and the device is capable of withstanding substantial lateral forces without failure.

In such devices, the socket is initially formed with an entrance opening from one side sized to admit the ball member. The portion of the socket remote from such entrance opening is normally formed initially with a spherical inner surface. During manufacture, the ball is positioned within the housing by being inserted through the large entrance opening and a lip around such entrance opening is deformed inwardly to complete the socket. Because such units provide a metal-to-metal bearing surface, rapid wear tends to occur if proper lubrication is not provided. Further, pressure producing ridges can occur where the lip is inwardly deformed which tend to promote wear.

SUMMARY OF THE INVENTION

In accordance with the present invention, a novel and improved swivel bearing structure is provided in which a bearing material is molded within an outer metal socket member around a metallic inner ball member having a spherical bearing surface mating with the non-metallic bearing material. The various parts are proportioned so that side openings in the socket of the outer metal socket member have a diameter less than the diameter at the equator of the inner ball member. Consequently, even in the event of complete failure of the non-metallic bearing material, a metal-to-metal barrier exists to prevent lateral movement of the ball member from the socket. This provides a fail-safe device in which complete separation of the two metal members is virtually eliminated. Further, with this structure, the thickness of the non-metallic bearing material which retains the inner ball member within the bearing socket is substantially reduced and, therefore, the non-metallic bearing material cannot bend or fold out of the way and allow a failure to occur. Consequently, the bearing material can support higher lateral loads.

With this structure, substantially higher lateral forces can be supported when compared to the design of the '921 patent without failure of the bearing material. Further, since the bearing material is preferably formed of a self-lubricating material, requirement for external lubrication is normally eliminated. Still further, any imperfections of the internal lip surface produced during the inward deformation of such lip to form the completed sockets are covered by the non-metallic molded bearing material so that the socket produced is shaped to accurately mate with the external surface of the spherical bearing member.

With this invention, an improved ball and socket structure is provided which is capable of supporting larger loads than comparable prior art units. Further, the quantity of bearing material required during manufacture is reduced. Still further, a fail-safe structure is provided.

These and other aspects of this invention are illustrated in the accompanying drawings, and are more fully described in the following specification.

DETAILED DESCRIPTION OF THE DRAWINGS

Figure 1:
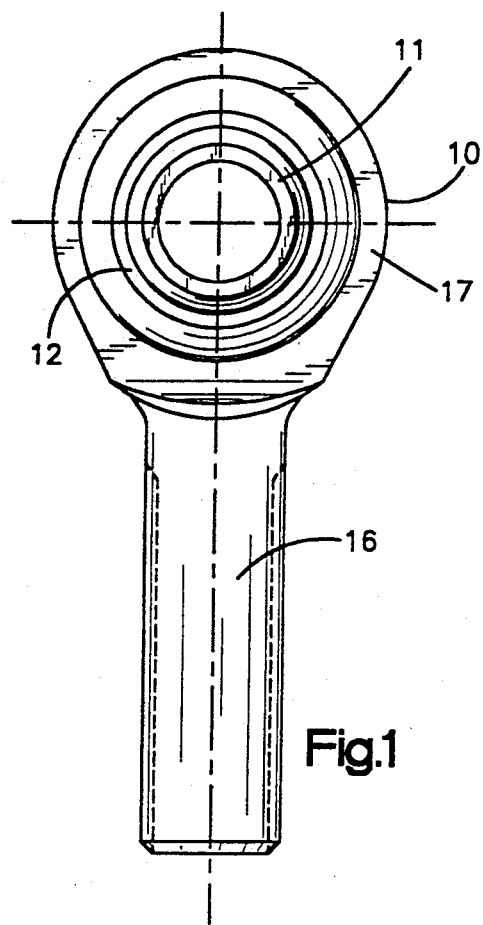
FIG. 1 is a front elevation of a ball and socket bearing assembly in accordance with the present invention.
Figure 2:
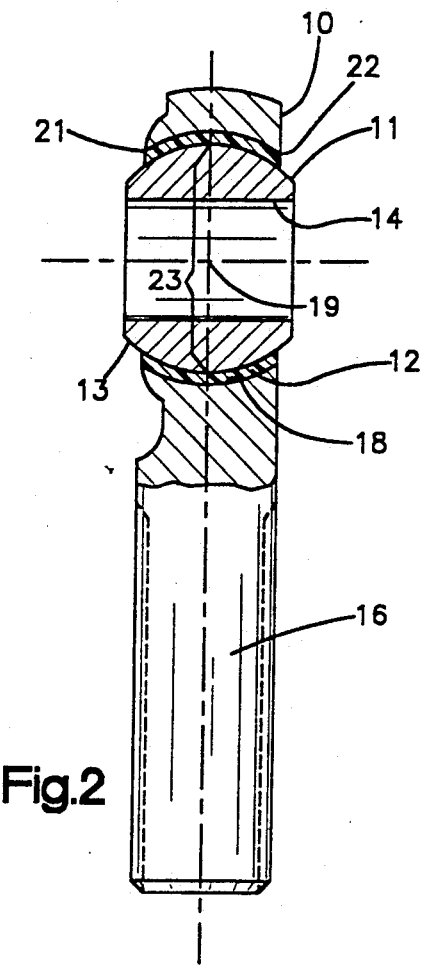
FIG. 2 is a side elevation, partially in longitudinal section, of the bearing assembly illustrated in FIG. 1.

A completed bearing assembly incorporating this invention is best illustrated in FIGS. 1 and 2. The assembly includes an outer metallic socket member 10 and an inner metallic ball member 11. Positioned between the socket member 10 and the ball member 11 is a bearing material 12 which is molded in place during the manufacture of the assembly, as described in detail below. Usually, such bearing material is a non-metallic plastic material which has self-lubrication properties.

The inner ball member is provided with a bearing surface 13 which is a portion of a sphere and mates with the inner surface of the bearing material 12 so that the inner ball member is movable with swivel movement in all directions with respect to the socket member 10.

In the illustrated embodiment, the ball member 11 is formed with a through-bore 14 to receive a connecting shaft when the assembly is installed for use. Other connecting structures, such as studs and the like, may be provided on the ball member and, in some instances, the passage 14 is threaded to connect with a threaded shaft or stud.

Further, in the illustrated embodiment, the socket member 10 is provided with a threaded shank 16 for installing the socket member in associated machinery or equipment. Here again, other forms of mounting structures may be used for the socket member 10.

The end of the socket member in which the ball member 11 is mounted provides a ring portion 17 formed with an inner socket surface 18 which, in the illustrated embodiment, is also a portion of a sphere. The inner socket surface 18 and the bearing surface 13 are preferably formed with a single center of curvature 19. In such instance, the thickness of the non-metallic bearing material 12 may be substantially uniform throughout its extent, or of non-uniform thickness optimized for greatest wearability and lateral strength. It should be understood, however, that recesses or surface irregularities can be provided in the inner socket surface 18 to facilitate the bonded connection between the bearing material 12 and such surface.

In the illustrated embodiment, the socket member is provided with two openings 21 and 22, each having a diameter less than the maximum or equator diameter of the ball member 12, as indicated by the bracket 23. Consequently, even if the bearing material 12 did not exist, a metal-to-metal interference would exist to prevent lateral movement of the ball member 11 out of the socket formed by the inner socket surface 18. This is an important feature of this invention, since it provides a fail-safe feature in the event that the bearing material is destroyed or fails for any reason.

Further in accordance with this invention, the bearing material is formed as a relatively thin layer particularly adjacent to the openings 21 and 22. For example, in the illustrated embodiment in which the passage 14 is ⅛ inch in diameter, the thickness of the bearing material is preferably about 1/32 inch, but should not exceed about 1/16 inch. By forming the bearing material as a relatively thin layer, greater resistance to deformation is provided and any displacement of the material must be essentially by extrusion rather than by bending or the like. Consequently, the bearing material provides substantially greater resistance to ball member pullout than in the design of the '921 patent, supra.

This provision of a relatively thin, non-metallic bearing material in combination with an interference fit between the outer surface of the ball member and the metal surrounding the openings 21 and 22 results in an assembly which provides improved pullout resistance while the bearing material functions properly and a fail-safe feature to prevent pullout of the bearing member in the event of failure of the non-metallic bearing material for any reason.

Figure 3:
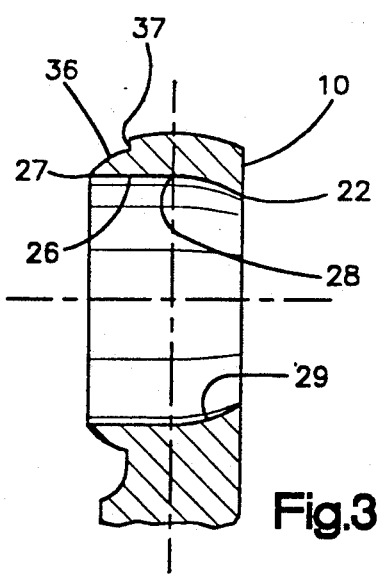
FIG. 3 is a fragmentary, longitudinal section of the preliminary socket formed in the outer bearing member before the lip thereof is deformed inwardly.
Figure 4:
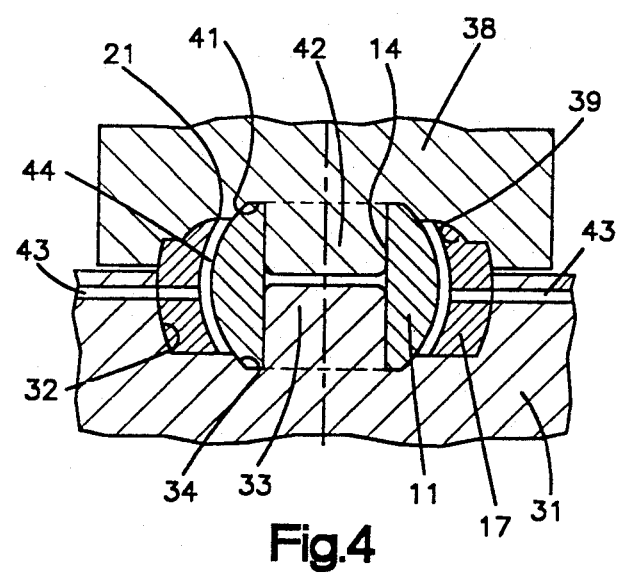
FIG. 4 is a fragmentary view of the apparatus for deforming the lip and also injecting the non-metallic bearing material into the cavity between the two metallic bearing members.

Reference should now be made to FIGS. 3 and 4 for a clear understanding of a preferred method and apparatus for producing the bearing assembly of FIGS. 1 and 2. FIG. 3 is a fragmentary cross section of the socket portion of the socket member 10 as initially formed. Initially, the socket is shaped to provide a cylindrical entrance portion 26 extending from an open end 27 to a location 28 contained in the plane of the equator of the finished socket surface 18. From the location or plane 28, the socket provides a spherical portion 19 having the same radius of curvature as the finished socket surface 18 and extending to the opening 22. Because the opening 27 has a diameter greater than the equator diameter of the bearing member 11, the bearing member can be inserted into the socket member.

Thereafter, the initial socket member 10 and the bearing member 14 are placed in a die set including a lower die 31 providing a recess 32 shaped to receive and mate with the surfaces of the socket portion 17 remote from the opening 27. The die 31 also provides a projection 33 and recess 34 sized to mate with and closely fit the adjacent portion of the bearing member 11.

As initially formed, the socket portion 17 is provided with a lip 36 of reduced cross section surrounding the cylindrical entrance portion 26. The lip 36 has a minimum thickness adjacent to the opening 27 and extends therefrom with increasing thickness to a location 37 on the side of the location 28 toward the opening 27.

The other or upper die 38 is formed with a first recess 39 shaped to deform the lip 36 inwardly adjacent to the opening 21 to reduce the diameter of the opening to a diameter less than the equator diameter 23 of the bearing member. Preferably, the upper die and the lip are shaped so that the lip is deformed inwardly, so that the inner surface of the lip provides a substantially spherical portion having the same radius as the remaining spherical portion 29. The upper die 38 is also formed with a second recess 41 and cylindrical projections 42 sized and shaped to respectively mate with the adjacent end of the bearing member 11 and the central passage 14 therein. As the upper die is moved toward the lower die to the closed position illustrated in FIG. 4, the lip 36 is deflected inward to finish-form the shape of the socket. Further, the dies center the ball member within the socket so a substantially uniform clearance exists. Since the dies close the gap or clearance between the socket member and ball member adjacent the side opening, the dies may also be used as mold parts to cooperate with the socket member 10 and bearing member 11 to define a cavity 44 into which the bearing material 12 is injected to complete the manufacture of the bearing. Preferably the socket is provided with opposed radial openings 43 through which the bearing material can be injected into the cavity 44.

It is also within the scope of this invention to provide tooling which provides slight lateral reciprocation of the ball, as described in U.S. Pat. No. 3,629,921.

Figure 5:
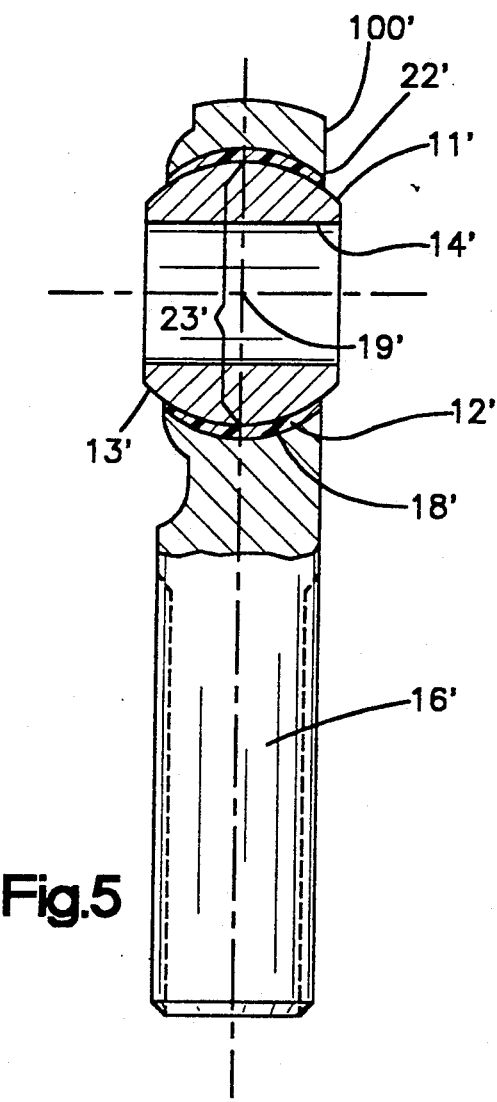
FIG. 5 illustrates an embodiment in which the thickness of the bearing material is thinned toward the lateral sides thereof.

FIG. 5 illustrates a second embodiment in which the bearing material is thickest at the equator and is gradually thinned as it extends from the equator to its sides or lateral edges. In this embodiment, similar references are used to indicate similar structural elements indicated in the first embodiment, but a prime (') is added to indicate reference to the second embodiment. Here again, the bearing surface 13' is formed with a center of curvature at 19'. However, in this embodiment, the inner socket surface 18' is provided with a radius of curvature less than the corresponding radius of curvature of the surface 18 of the first embodiment. Therefore, the center of curvature of inner surface 18' is different from the center of curvature of the surface 13'. This produces an assembly in which the bearing material 12' thins as it extends from the equator. This structure tends to optimize wearability and lateral strength.

Preferably, the bearing material is a nylon plastic containing about 15% PTFE, 30% glass fibers, and 2% silicone. However, other plastics of moldable non-metallic material or moldable metallic bearing materials can be substituted for this specific bearing material. Preferably, however, such bearing material is selected to operate for extended periods of time without lubrication.

Although the preferred embodiments of this invention have been shown and described, it should be understood that various modifications and rearrangements of the parts may be resorted to without departing from the scope of the invention as disclosed and claimed herein.

What is claimed is:

1. A ball and socket swivel bearing comprising a metallic socket member defining a socket having an inner surface and having at least one side opening, a metallic swivel ball member having an exterior spherical bearing surface positioned within said socket and providing an equator within said socket, said bearing surface being spaced from said surface of said socket and cooperating therewith to define a cavity, a bearing material molded in said cavity providing an interior spherical bearing surface mating with said exterior spherical bearing surface and an outer surface mating with the adjacent surface of said socket, said bearing material supporting said ball member during swiveling movement thereof relative to said socket member, said ball member being accessible through said side opening, said socket member providing retainer surfaces on both sides of said equator having a diameter less than the diameter of said equator of said ball member and spaced from said ball member during normal operation, said retainer surfaces preventing movement of said ball member out of said socket in the event said bearing material fails, said socket member providing a thinned laterally extending lip along one side thereof providing one of said retainer surfaces.

2. A bearing as set forth in claim 1, wherein said ball member provides connecting means accessible through said side opening.

3. A bearing as set forth in claim 1, wherein said socket member provides two opposed similar side openings through both of which said ball member is accessible.

4. A bearing as set forth in claim 1, wherein said exterior bearing surface and said inner surface have substantially the same center of curvature, and said bearing material has a substantially uniform thickness.

5. A bearing as set forth in claim 1, wherein the bearing material has a greater thickness at said equator than at the lateral edges thereof.

6. A bearing as set forth in claim 5, wherein the center of curvature of the inner surface is spaced from the center of curvature of said exterior bearing surface.

7. A bearing as set forth in claim 1, wherein said bearing material is non-metallic and has properties of self-lubrication.

8. A bearing as set forth in claim 7, wherein said bearing material is a nylon plastic having about 15% PTFE, 30% glass fibers, and 2% silicone.

9. A bearing as set forth in claim 1 wherein a portion of said socket member surrounding the other of said retainer surfaces is substantially thicker than said lip.

10. A bearing as set forth in claim 9 wherein said socket member is formed with the other of said retainer surfaces before said swivel ball member is positioned within said socket.

11. A bearing as set forth in claim 10 wherein said lip is deformed inwardly to provide said one of said retainer surfaces after said swivel ball member is positioned within said socket.

* * * * *

REEXAMINATION CERTIFICATE (3757th)

United States Patent [19]

O'Connell

[11] B1 5,073,038

[45] Certificate Issued May 11, 1999

[54] SWIVEL BEARING

[75] Inventor: Timothy B. O'Connell, Fort Wayne, Ind.

[73] Assignee: Tuthill Corporation, New Haven, Ind.

Reexamination Request:
No. 90/004,744, Aug. 26, 1997

Reexamination Certificate for:
Patent No.: 5,073,038
Issued: Dec. 17, 1991
Appl. No.: 07/551,286
Filed: Jul. 12, 1990

[21] Appl. No.: 07/551,286
[51] Int. Cl.⁶ ............................................. F16C 23/04
[52] U.S. Cl. ........................ 384/206; 384/203; 384/208
[58] Field of Search ................................ 384/192, 202, 384/203, 206–212; 29/898.05

[56] References Cited

U.S. PATENT DOCUMENTS

| | | | |
|---|---|---|---|
| 3,085,312 | 4/1963 | Evans | 384/203 X |
| 3,629,921 | 12/1971 | Davies et al. | 29/898.05 X |
| 3,662,462 | 5/1972 | Shiflet | 384/206 X |
| 4,033,019 | 7/1977 | Orkin | 384/203 X |
| 4,080,015 | 3/1978 | Greby et al. | 384/206 |

FOREIGN PATENT DOCUMENTS

| | | |
|---|---|---|
| 873018 | 4/1953 | Germany . |
| 964285 | 10/1982 | U.S.S.R. . |

OTHER PUBLICATIONS

Drawing No. AMLT–08–GP, dated Jan. 6, 1989, entitled Teflon Lined Rod End.
Drawing entitled AMT Assembly Process, undated.

*Primary Examiner*—Thomas R. Hannon

[57] ABSTRACT

A ball and socket bearing having a spherical ball member positioned within a non-metallic, molded bearing material which is in turn molded within a socket formed in a socket member. The socket provides openings on either side of the equator of the ball member having a radius less than the radius of the equator of the ball member so that a metal-to-metal interference prevents lateral separation of the members even in the event of bearing material failure. Further, the bearing material is relatively thin, at least between the ball member and socket adjacent to the lateral opening, so that the bearing material can support high lateral loads.

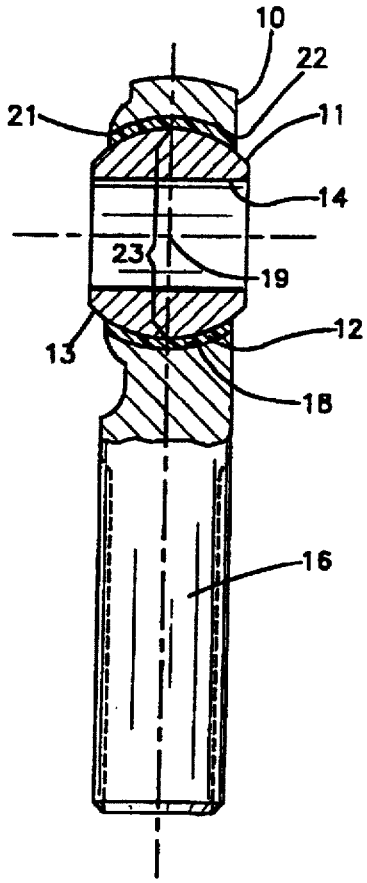

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–11 are cancelled.

* * * * *